United States Patent [19]

Bishop

[11] 4,189,955
[45] Feb. 26, 1980

[54] RACK AND PINION STEERING GEAR FOR AUTOMOTIVE VEHICLES

[76] Inventor: Arthur E. Bishop, 17 Burton St., Mosman, New South Wales, Australia

[21] Appl. No.: 587,286

[22] Filed: Jun. 16, 1975

[30] Foreign Application Priority Data

Jun. 21, 1974 [AU] Australia .............................. PB7941

[51] Int. Cl.² .............................................. B62D 5/10
[52] U.S. Cl. .................................... 74/498; 180/79.3
[58] Field of Search ................ 74/498, 422; 192/4 R; 180/79.2, 79.3

[56] References Cited

U.S. PATENT DOCUMENTS

| 3,623,379 | 11/1971 | Bradshaw et al. | 74/498 |
| 3,777,589 | 12/1973 | Adams | 74/498 |
| 3,814,202 | 6/1974 | Rushton et al. | 74/422 X |

FOREIGN PATENT DOCUMENTS

| 1075959 | 2/1960 | Fed. Rep. of Germany | 74/498 |
| 1307791 | 2/1973 | United Kingdom | 74/498 |

Primary Examiner—John J. Camby
Assistant Examiner—Larry I. Schwartz
Attorney, Agent, or Firm—Hill, Van Santen, Steadman, Chiara & Simpson

[57] ABSTRACT

A rack and pinion steering gear incorporating controlled rack loading through the range of rack operation and providing optional pinion damping or braking selectively preventing or minimizing road shock forces from affecting the steering wheel without inhibiting steering motions by the driver, and providing optional improved ball-stud cross-rod construction.

9 Claims, 9 Drawing Figures

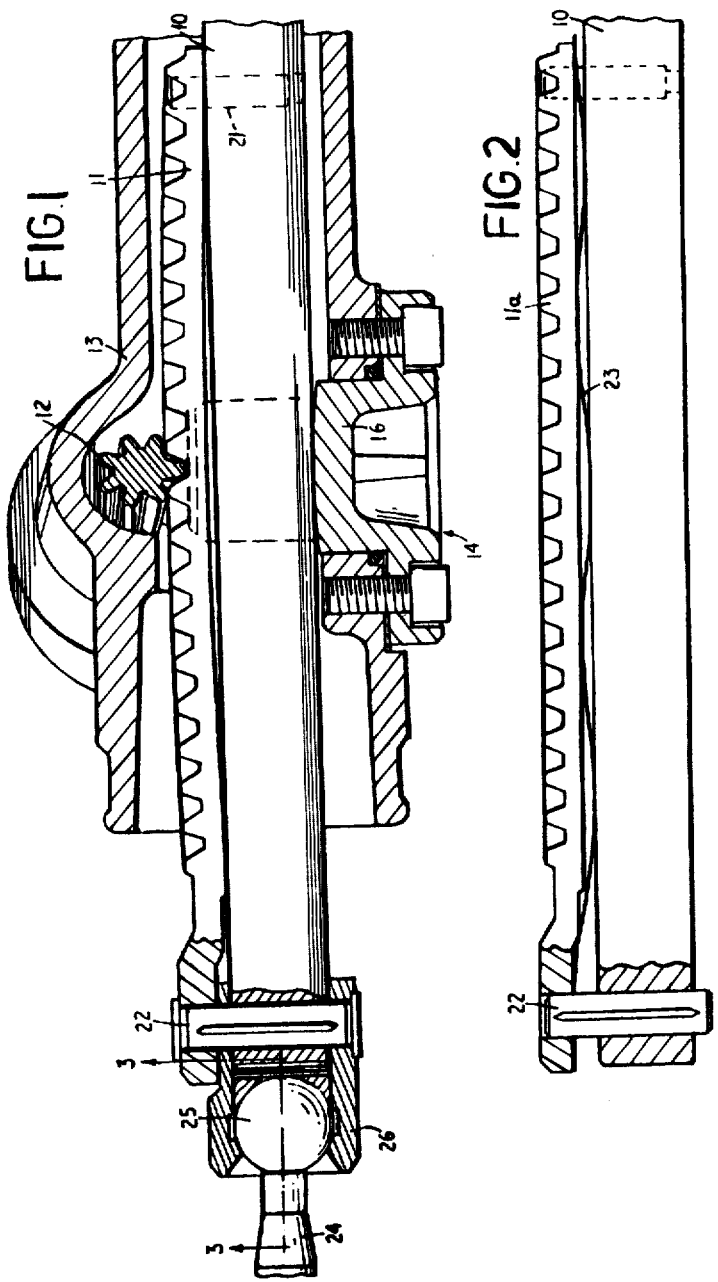

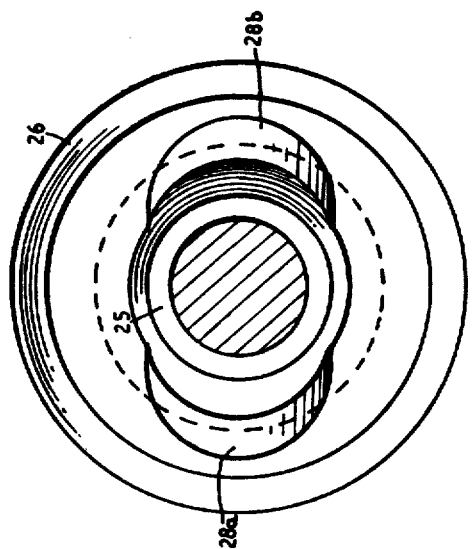
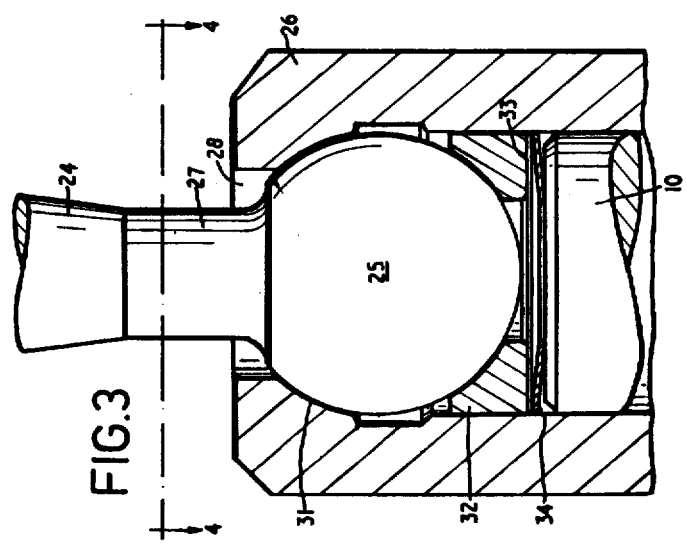

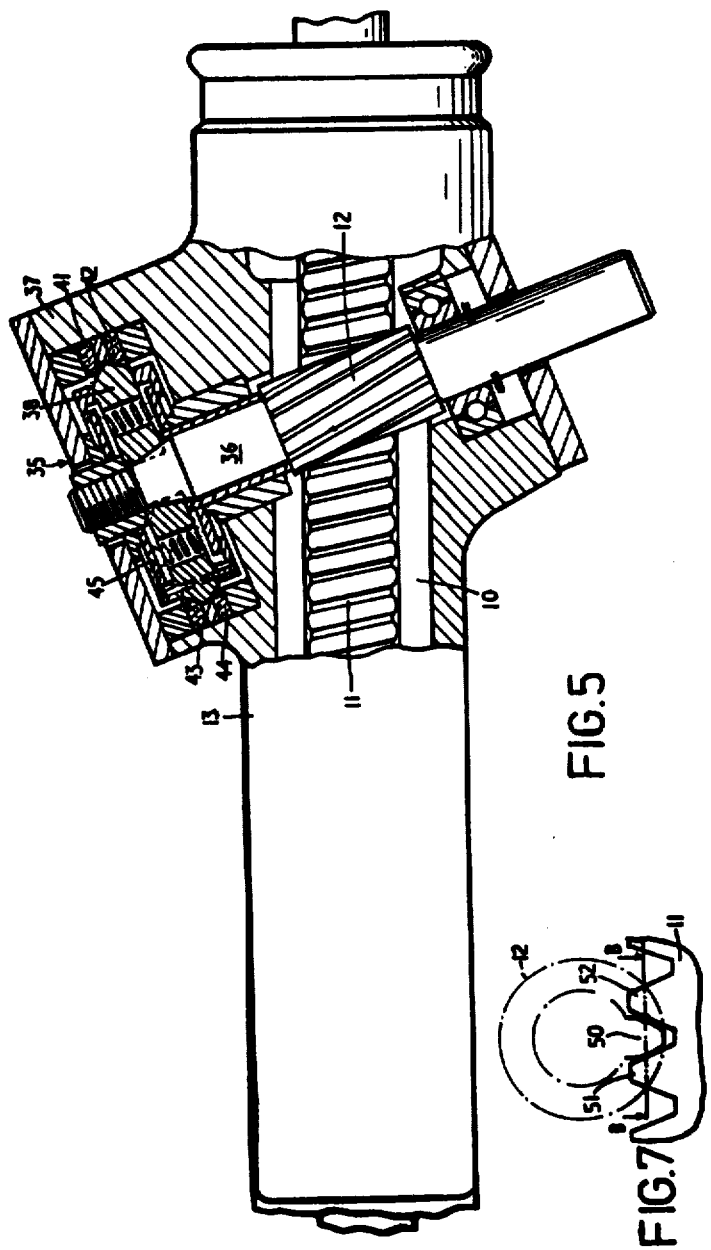

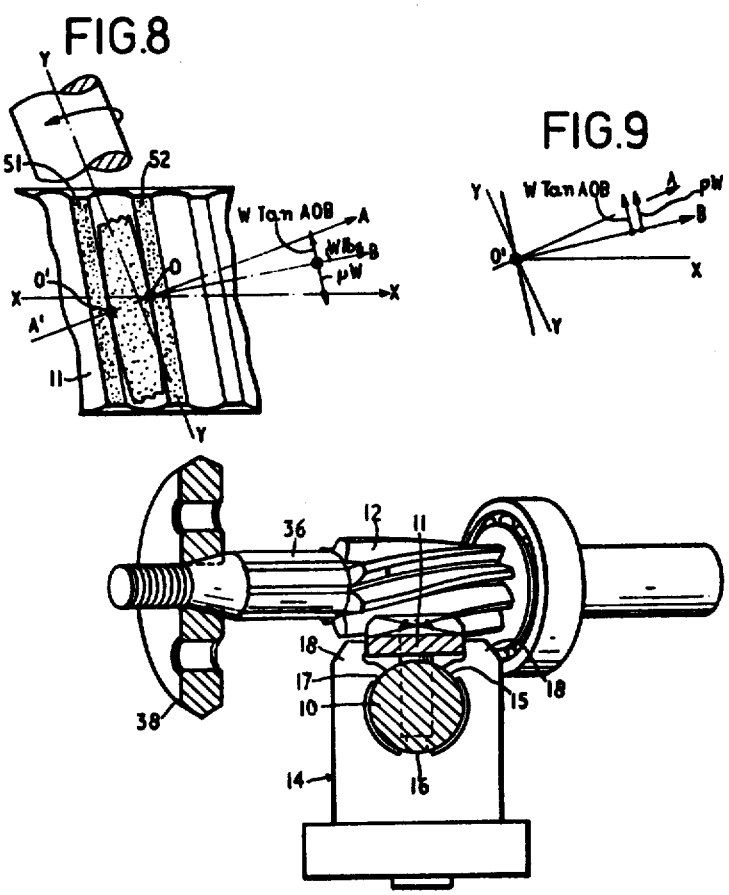

RACK AND PINION STEERING GEAR FOR AUTOMOTIVE VEHICLES

The present invention relates to improvements in rack and pinion steering gear mechanisms for automotive vehicles and has as its object the provision of a number of features of construction for use in rack and pinion steering gears capable of being used independently or in combination and which assist in the solution of various problems that arise in the construction of practical steering gear mechanisms.

It has been previously proposed, for example in the specification of my co-pending U.S. Pat. Application Ser. No. 410,114 filed on Oct. 8, 1973, to provide a rack which instead of being formed integrally with a cross-rod of a steering gear is formed separately and is connected to the cross-rod. Other proposals are to be found in British Pat. Nos. 1,158,891 and 1,295,433. Such separate racks are provided with a separate bearing system in which they are movable and in association with which a means for spring-loading the rack against its associated pinion is provided. The separately guided cross-rods of such arrangements are better able to carry the suspension forces to which they are subjected if they are not supported in a spring loaded manner.

In a first aspect, the present invention provides a rack and pinion steering gear wherein the rack is formed as a separate member which is mounted directly on and connected to the cross-rod of the steering gear thus avoiding the necessity for the provision of a separate bearing system and associated spring-loading to support the rack.

It is preferred to provide a member or members which serve to guide the rack axially while restraining sideway movement but leaving some freedom of movement in a direction towards or away from the cross-rod, while acting to support the cross-rod and restrain it from movement in all directions other than the axial direction.

The rack may be flexibly cambered to provide spring-loading between the rack and the pinion. Such an arrangement may be constructed to provide a greater spring-load between the rack and the pinion in the central position and a diminished load off center. With prior arrangements the same spring-load was provided between the rack and pinion at all positions of travel of the rack.

In the arrangement described above, in place of the cambering of the rack, the rack may be mounted so that it is spaced from the cross-rod by, for example, a wave spring arranged to provide the spring-loading between the rack and the pinion. In this connection it should be noted that by the provision of a rack that is supported on but separate from the cross-rod, relatively light spring-loading may be provided between the rack and the pinion, for example in the central position the load may be about ⅛ of the loading currently used. The loading at the ends of the rack will be correspondingly less than this if the rack is cambered.

In a rack and pinion steering gear according to the invention a simplified form of construction may be provided by means of which the cross-rod of the rack and pinion steering gear are connected to a tie-rod of the steering gear mechanism by means of a ball-joint, the arrangement comprising a ball on the end of a tie-rod held captive in a ball housing fitting directly on to an end of the cross-rod and being secured thereto in a predetermined relation by means of a pin passing transversely through the cross-rod, spring means being provided to load the ball so as to seat in a part-spherical seating in the housing, the housing having in it an aperture through which the tie-rod passes, the aperture being shaped to permit a small degree of angular travel of the tie-rod in a plane lying parallel to a road surface while providing a large degree of angular travel in a plane at right angles thereto. It is preferred that the ball is spring-loaded by means of a combination of a shim and a coned disc spring acting on the end of the cross-rod, the shim permitting selective assembly in which a shim of an appropriate thickness is selected to provide the desired loading on the ball.

The arrangement described has the advantage of simplicity of construction on the one hand and, by reason of the securing of the ball housing to the cross-rod in a predetermined position by means of the pin, allows for the use of a ball considerably smaller in diameter than those at present in general use and compatible with the smaller diameter of the cross-rod that may be used where a separate rack is provided. This arises from the fact that the predetermined relationship between the housing and the rod permits the aperture in the housing to be formed to give different degrees an angular movement of the tie-rod in different planes thus permitting the housing to be constructed so as to give adequate support to the ball. A further advantage of the construction is that the pin used for securing the ball housing to the cross-rod can also be used for securing a rack to the cross-rod.

It is highly desirable in a rack and pinion steering mechanism to reduce friction to assist in providing a driver with a good sense of road feel particularly when the forces being transmitted from the road are small and to reduce the transmission of road shocks from the road wheels to the steering wheel when the forces are in the nature of rapidly applied shocks. The achievement of one or other of these desiderata however can be detrimental to the achievement of the other, thus provisions to diminish the effect of road shocks can introduce additional friction which is a well known characteristic of rack and pinion steering gear mechanisms currently used.

In an endeavor to overcome this difficulty in a further aspect the invention provides a rack and pinion steering gear mechanism wherein a pinion is carried on a shaft operatively associated with a braking device and means whereby on the application of a road shock force from the rack to the pinion acting to turn the pinion about the axis of the shaft, lost motion of the said shaft is utilized to actuate said braking device to inhibit the rotation of the shaft and thus the transmission of forces from the rack to the steering wheel, means being provided whereby said braking device is actuated only when the force applied by the rack to the pinion exceeds a predetermined value, further means being provided whereby said braking device is not actuated or is actuated to a reduced extent by reason of forces applied to the pinion to the rack.

One manner in which this aspect of the invention may be embodied is by utilization of the discovery that if the helix angle of a helical pinion roughly matches the coefficient of friction between the mating surfaces of the teeth of the rack and the pinion the application of a force from the rack tending to turn the pinion will give rise to a force that will, by utilizing lost motion in the assembly, cause axial movement of the pinion which is further utilized to provide a braking force tending to resist rotation of the pinion and thus of the steering wheel, whereas rotation of the pinion by means of the steering wheel does not produce such an axial force. This concept is described below in greater detail in connection with a preferred embodiment of the invention.

In order that the nature of the various aspects of the invention may be better understood a preferred form of construction embodying them is hereinafter described, by way of example, with reference to the accompanying drawings in which:

FIG. 1 is a part sectional elevation of a rack and pinion steering gear,

FIG. 2 is a view showing a portion of the arrangement of FIG. 1 in which the rack is mounted on the cross-rod through a wave spring, FIG. 3 is an enlarged view in section on the line 3—3 of FIG. 1, FIG. 4 is an end elevation in section on the line 4—4 of FIG. 3, FIG. 5 is a plan view partly in section of the steering gear of FIG. 1 showing the steering damper, FIG. 6 is a part sectional view showing the means for guiding the rack and cross-rod but with the housing removed for clarity, FIG. 7 is a sectional view through the pinion showing the engagement of a tooth of the pinion with adjacent teeth of the rack, FIG. 8 is a section on line 8—8 of FIG. 7, showing also a vector diagram of the forces acting between the pinion and the rack, under conditions in which a force is applied by the pinion to the rack and, FIG. 9 is a diagram of the forces acting when a force is applied by the rack to the pinion.

The steering gear illustrated in the drawings combines the various aspects of the present invention as a convenient means of illustrating their application. The steering gear shown consists of a cross-rod 10 on which is mounted directly a rack 11, with which a helical pinion 12 is engaged, the part being enclosed within a housing 13. The cross-rod 10 is supported in the housing by a support bearing indicated generally at 14. As will be seen from FIG. 6 this support bearing acts to support and guide the cross-rod 10, preventing it from moving in any direction except the axial direction, the cross-rod being supported between the three projecting portions 15, 16 and 17 having part-circular internal surfaces. The support bearing 14 is provided at its upper end with ears 18 which between them act to guide the rack 11 and prevent it from lateral movement while permitting it to move in an axial direction and in a direction towards or away from the pinion.

As will be seen from FIGS. 1 and 6 the rack 11 is fixed to the cross-rod 10 at one end by a pin 21 and at the other end by a pin 22, the rack being cambered, as best seen in FIG. 1 and being made of resiliently flexible material. The camber as shown in FIG. 1 is exaggerated for clarity. The resilience of the rack and the camber provide a degree of spring-loading between the rack and the pinion acting to hold them in mesh. It will be observed however, that this degree of loading diminishes towards either end of the rack which is desirable for correct operation of the steering gear although not essential. The alternative construction shown in FIG. 1 shows a rack 11a which is not cambered but is supported from the rod 10 by means of a wave spring 23 which provides the spring-loading. This spring 23 may be arranged to provide a higher degree of spring-loading towards the center of the rack than at either end.

The cross-rod 10 is connected at one end of a tie-rod 24 which terminates in a ball 25. It should be noted that the diameter of this ball is of the same order as the diameter of the ross-rod 10 which, owing to the use of a separate rack can be made somewhat smaller than is the case with cross-rods in which the rack teeth are cut directly into the rod. The ball is held in position by means of a ball housing 26 which is best seen in FIGS. 3 and 4 which are to a considerably enlarged scale. The neck 27 that joins the tie-rod 24 and ball 25 passes through an aperture 28 in the housing 26 which, as can be seen in FIG. 4, has two lobes 28a and 28b which permit a high degree of angular movement of the tie rod 24 in the direction of the lobes. A relatively small degree of angular movement is permissible in the direction at right angles. This accords with the requirements of the steering gear in which only a relatively small degree of angular movement of the tie-rod in a direction parallel to the road surface is required whereas a high degree of movement is required in a direction at right angles. While the ball 25 has relatively little support where the lobes 28a and 28b occur it is adequately supported around the remainder of the periphery of the aperture.

The housing 26 has the usual part-spherical surface 31 against which the ball bears and also a ball cup 32 of conventional construction. The ball cup is held against the ball 25 by means of a shim 33 which is under the influence of the coned disc spring 34 which bears on the end of the cross-rod 10.

The ball housing 26 is assembled to the end of the cross-rod 10 as shown in FIG. 1, being secured in position by the pin 22 which also serves to secure the end of the rack 11. The fact that the ball housing 26 is secured by means of the pin rather than being screwed on the end of the cross-rod as in a conventional construction, means that there is a predetermined relationship between the housing 26 and more particularly the aperture 28 and the cross-rod thus allowing the use of an aperture of the shape shown, in contrast to the normal circular aperture which, in turn, permits the use of a smaller ball. In assembling the joint the shim 33 is chosen to provide the correct degree of pressure on the ball 25, a range of shims of different thicknesses being provided to take account of variations in the sizes of the parts due to manufacturing tolerances.

FIG. 5 shows the road shock damper assembly indicated generally at 35 which is connected to an extension 36 of the pinion 12. The damper is enclosed in an extension 37 of the housing 13 and consists of a disc 38 which is keyed to the extension 36 and rotates with it. This is provided with two inclined faces 41 and 42 on its circumference which are surrounded by annular members 43 and 44 having correspondingly shaped internal faces. The members 43 and 44 are made of a suitable friction material. Although this is not seen clearly in the drawing, owing to the scale, there is in fact an air gap between the faces 41 and 42 and the annular members 43 and 44 when the disc 38 is in the centralized position shown in FIG. 5. It is maintained in this position by means of springs 45 which act in an axial direction and which are arranged in such a manner that unless an axial force exceeding a predetermined value is applied to the pinion 12 the disc 38 is maintained in the position shown in FIG. 5.

As will be explained in more detail below any road shock forces transmitted by the rack 11 to the pinion 12 produce a tendency for axial movement in the pinion the direction of which will depend on the direction of movement of the rack 11. There will also be a force acting to rotate the pinion and thus rotate the steering wheel (not shown). Axial movement of the extension 36 and with it the disc 38 which will occur as a result of the axial force, but only when accompanied by slight rotation of the pinion, will bring one or other of the inclined faces 41 or 42 into contact with the corresponding friction member 43 or 44 which contact will tend to inhibit rotation of the pinion 12. As was mentioned above the force acting on the pinion in an axial direction must exceed a predetermined value before the disc 38 is displaced axially. This is necessary so as to avoid bringing the damper into action when, for example, the steering wheel is released to enable the normal self-centering action to take place after coming out of a corner.

For the proper functioning of the damper described above it is necessary that the target of the helix angle of the pinion 12 should roughly match the coefficient of friction between the mating surfaces of the teeth of the rack 11 and the pinion 12. When this occurs the damper will act as described above but on the other hand when the steering wheel is turned there will be little or no tendency for the pinion 12 to move in an axial direction.

The action described above may be understood in terms of FIGS. 7, 8 and 9. FIG. 7 being a sectional view of the pinion 12 showing a single tooth 50 of the pinion meshing between two teeth 51 and 52 of the rack 11, and FIG. 8 being a sectional view on the line 8—8 of FIG. 7. The pinion is considered as rotating about the axis Y—Y in the direction shown by the arrow and the rack is considered as moving along the axis X—X. When the steering wheel is turned an element of the pinion will press against the adjacent rack tooth 52 at O with a force of magnitude W normal to the tooth. As rotation of the pinion commences the pinion will tend to roll along the line OA/ and must be restrained from doing so by a force equal to $\mu W$ applied normal to the tooth interface. This force may be supplied by the vector of the normal force W due to the pinion helix angle AOB which also acts normal to tooth interface. By correct choice of the helix angle the opposing forces $\mu W$ and W Tan AOB can be made to balance so that there is no unbalanced axial force acting on the pinion.

On the other hand of the rack is acting to move the pinion due to movement of a road wheel contact will take place at the other side of the pinion 50 at the point O/. In this case the force diagram is illustrated in FIG. 9 and is the same as that shown in FIG. 8 except that the frictional force $\mu W$ and now acts in the same direction as the force WT and AOB and both act together to move the pinion in an axial direction.

The arrangement described above thus provides damping tending to prevent the transmission of road shock either in straight running or in turns, to the steering wheel. It should be appreciated that the transmission of such shocks can take place more readily in a rack and pinion steering gear mechanism such as that described above in which the spring-loading between the pinion and the rack is relatively light.

In other forms of construction lost motion of the pinion shaft may be utilized to actuate a braking device due for example to bending of the shaft or a rocking movement of the shaft.

The embodiment of the invention described is given by way of example only as a means of illustrating the application of the various aspects of the invention and as will occur readily to those skilled in the art the various aspects of the invention referred to may be applied in other ways.

I claim as my invention:

1. A rack and pinion steering gear wherein a pinion is carried on a shaft driving interconnected with a braking device and means whereby, on the application of a road shock force from the rack to the pinion acting to turn the pinion about the axis of the shaft, lost motion of the said shaft is utilized to actuate said braking device to inhibit the rotation of the shaft and thus the transmission of forces from the rack to a steering wheel, means being provided whereby the said braking device is actuated only when the force applied by the rack to the pinion exceeds a predetermined value, further means being provided whereby said braking device is not actuated or is actuated to a reduced extent, by means of forces applied by the pinion to the rack.

2. A rack and pinion steering gear as claimed in claim 1 wherein the means whereby the said braking device is actuated only when the force applied by the rack to the pinion exceeds a predetermined value comprises resilient means arranged so that the said braking device is not actuated until the resilient force has been overcome.

3. A rack and pinion steering gear as claimed in claim 1 wherein the lost motion used is motion in the direction of the axis of the said shaft and wherein the said further means consists of the provision of the pinion of a helix angle the target of which is approximately equal to the coefficient of friction between the mating surfaces of the teeth of the rack and the pinion.

4. A rack and pinion steering gear as claimed in claim 3 wherein the braking device consists of at least one disc mounted for rotation with said shaft, having a pair of frusto-conical circumferential faces arranged between corresponding opposed frusto-conical friction faces, axial movement of said shaft acting to bring one or other of the said inclined faces into contact with one or other of said friction faces.

5. A rack and pinion steering gear having a cross-rod and a rack cooperating with a pinion, wherein the rack is formed as a member separate from and mounted directly on and connected to the cross-rod, said rack being positioned between said cross-rod and said pinion and being supported by said cross-rod against forces exerted by said pinion against said rack tending to move said rack toward the axis of the cross rod, said rack being flexibly cambered in an axial direction to provide spring loading between the rack and the pinion.

6. A rack and pinion steering gear as claimed in claim 5 wherein the cross-rod of the rack and pinion steering gear are connected to a tie rod of the steering gear mechanism by means of a ball-joint, the arrangement comprising a ball on the end of a tie-rod held captive in a ball housing fitting directly on to an end of the cross-rod and being secured thereto in a predetermined relation by means of a pin passing transversely through the cross-rod, spring means being provided to load the ball so as to seat in a part-spherical seating in the housing, the housing having in it an aperture through which the tie-rod passes, the aperture being shaped to permit a small degree of angular travel of the tie-rod in a plane lying approximately parallel to a road surface while providing a large degree of angular travel in a plane at right angles thereto.

7. A rack and pinion steering gear as claimed in claim 6 wherein the ball is spring-loaded by means of a combination of a shim and a coned disc spring acting on the end of the cross-rod, the shim permitting selective assembly in which a shim of an appropriate thickness is selected to provide the desired loading on the ball.

8. A rack and pinion steering gear having a cross-rod and a rack cooperating with a pinion, wherein, the rack is formed as a member separate from and mounted directly on and connected to the cross-rod, said rack being positioned between said cross-rod and said pinion and being supported by said cross-rod against forces exerted by said pinion against said rack tending to move said rack toward the axis of the cross rod, said rack being supported by resilient means on the cross-rod to provide spring loading between the rack and the pinion.

9. A rack and pinion steering gear as claimed in claim 8 wherein the arrangement is such that the spring loading between the rack and the pinion is greatest in the central position of the rack and diminished towards the ends of the rack.

* * * * *